F. W. CONGER.
TRAP NEST.
APPLICATION FILED AUG. 22, 1916.
1,216,213.
Patented Feb. 13, 1917.
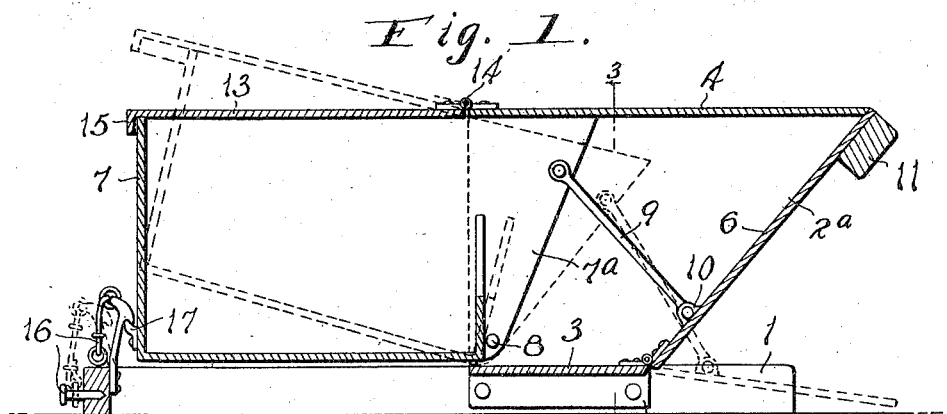
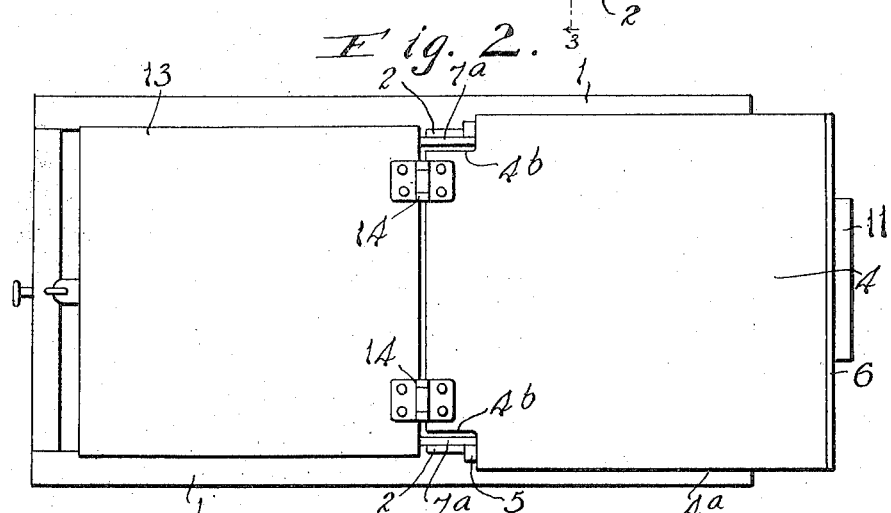
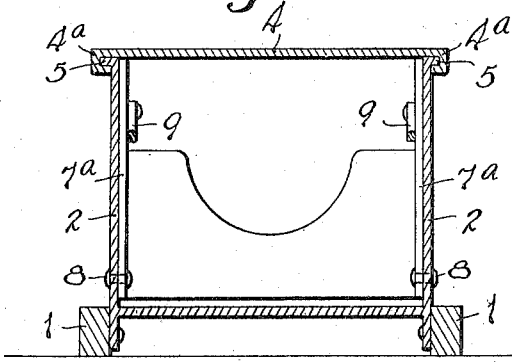
Inventor
F. W. CONGER
By
N. S. Hill   Attorney

UNITED STATES PATENT OFFICE.

FRANK W. CONGER, OF HOGAN, MONTANA.

TRAP-NEST.

1,216,213.   Specification of Letters Patent.   Patented Feb. 13, 1917.

Application filed August 22, 1916. Serial No. 116,219.

*To all whom it may concern:*

Be it known that I, FRANK W. CONGER, a citizen of the United States, residing at Hogan, in the county of Lewis and Clark, State of Montana, have invented a new and useful Trap-Nest; and I do hereby declare the following to be a full, clear, and exact description of the invention, such as will enable others skilled in the art to which it appertains to make and use the same.

The present invention relates to certain new and useful improvements in trap nests, and has for its object to provide a device of this character which embodies novel features of construction whereby a trap door is automatically closed when a hen enters the nest, thereby preventing the hen from being disturbed, and also providing a means whereby the laying hens of a flock can be discovered.

Further objects of the invention are to provide a device of this character which is comparatively simple and inexpensive in its construction, which operates in such a manner as not to frighten the hen, which is water-tight and can be left in the open, and which admits of the eggs being readily removed from the nest.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a longitudinal sectional view through a trap nest constructed in accordance with the invention, the open position of the nest being shown by dotted lines and the closed position of the nest by full lines.

Fig 2 is a top plan view of the trap nest.

Fig. 3 is a transverse sectional view on the line 3—3 of Fig. 1.

Corresponding and like parts are referred to in the following description and indicated in all the views of the drawings by the same reference characters.

Referring to the drawings, which illustrate one embodiment of the invention, the numerals 1 designate a pair of spaced and longitudinally extending sill members which provide a support for the nest. A pair of sides 2 project upwardly from the sills 1 at intermediate points in the length of the latter, the forward ends of the sides being beveled upwardly and outwardly, as indicated at $2^a$. A bottom or platform 3 connects the lower ends of the sides 2, being normally supported in an elevated position by the sills 1. A sliding cover plate 4 connects the upper edges of the sides 2, the sides of the cover being shown as returned at $4^a$ to slidably engage outwardly extending flanges or lips 5 upon the sides 2.

An upwardly swinging trap door 6 is pivoted at its lower edge to the front of the bottom or platform 3, being adapted to swing upwardly against the beveled edges $2^a$ of the sides to close the entrance to the nest. A nest box 7 is pivotally mounted between the sides 2 at the rear thereof so as to be susceptible of a swinging movement. The sides and back of the nest box have the same height as the rigid sides 2, the forward ends of the nest box sides being extended at $7^a$ and slidably received within the sides 2, said extensions $7^a$ being provided at the lower ends with pivot members 8 which engage the sides 2, and the upper ends thereof being pivotally connected by links 9 to an arm 10 projecting upwardly from the trap door 6 at a point spaced from the pivot point thereof. With this construction it will be obvious that when the trap door 6 is swung downwardly into a horizontal and open position the nest box 7 will be tilted forward, and the said trap door may be provided with a slight counter-weight 11 so that under normal conditions the trap door will overbalance the nest box and remain in an open position. The front of the nest box is formed by a comparatively shallow transverse partition which has the usual notch or cut-away portion in the upper edge thereof to accommodate the hen when entering and leaving the box.

The sliding cover plate 4 has the rear corners thereof notched or cut-away at $4^b$ to provide a clearance space for the sides of the nest box 7 when the latter is tilted forward, and a swinging cover plate 13 is hingedly connected at 14 to the rear edge of the sliding plate 4, said swinging cover plate 13 normally resting loosely upon the top of the nest box, and being provided at the sides and rear edge thereof with downwardly extending flanges 15 which prevent rain from entering the nest box. This swinging cover plate 13 accommodates itself to the movements of the nest box 7, and can be easily swung upwardly for the purpose of obtaining access to the nest box when it is desired to remove an egg therefrom.

As previously explained, the trap door 6 is normally in an open position so that a hen can enter the nest without difficulty. When the hen steps into the nest box 7, however, the additional weight will cause the nest box to swing downwardly upon the sills 1, at which time the trap door 6 will be swung upwardly into a closed position. The hen will thus be secured against disturbance, and a special marker may be provided for marking the hen before she leaves the nest, or means may be provided for locking the hen within the nest until she is released. Where a special marker is provided, no latch means will be necessary for holding the nest in a closed position, and as soon as the hen leaves the nest and steps upon the trap door 6, the latter will open and permit the egress of the hen.

Where it is desired to trap the hen within the nest, one of the sills 1 may be provided with a spring detent for engagement with a latch member 17 upon the side of the nest box, so that when the nest box swings downwardly the spring detent will automatically engage the latch member and hold the nest box in a closed position until the detent is manually released. Suitable means, such as that indicated at 16 may be provided for holding the detent in an inoperative position when it is not desired to use the same. It will be understood that by the use of a device of this character the laying hens of a flock can be easily detected.

Having thus described the invention, what I claim as new and desire to secure by Letters Patent, is:—

A trap nest including a base, fixed sides extending upwardly from the base, a bottom plate connecting the sides, a sliding cover plate removably applied to the upper edges of the fixed sides, an upwardly swinging trap door hingedly connected to the forward edge of the bottom plate, a tilting nest box provided at the sides thereof with forward extensions which are received between the rear ends of the fixed sides, the lower portions of the forward extensions being pivotally connected to the fixed sides, an arm projecting from the trap door, a link connecting the arm and one of the forward side extensions of the nest box, whereby the trap door is swung into a closed position when the nest box is tilted by the weight of a hen, and a swinging cover plate resting loosely upon the top of the nest box and hingedly connected to the rear edge of the before mentioned sliding cover plate.

In testimony whereof I have signed my name to this specification in the presence of two subscribing witnesses.

FRANK W. CONGER.

Witnesses:
R. C. ASSELATIVE,
L. J. RYAN.

Copies of this patent may be obtained for five cents each, by addressing the "Commissioner of Patents, Washington, D. C."